United States Patent
Hong et al.

(10) Patent No.: US 8,933,844 B2
(45) Date of Patent: Jan. 13, 2015

(54) ANTENNA PATTERN FRAME, ELECTRONIC DEVICE CASE PROVIDED WITH ANTENNA PATTERN FRAME AND ELECTRONIC DEVICE INCLUDING ELECTRONIC DEVICE CASE

(75) Inventors: Ha Ryong Hong, Gyunggi-do (KR); Sung Eun Cho, Gyunggi-do (KR); Tae Sung Kim, Seoul (KR); Duk Woo Lee, Gyunggi-do (KR); Dae Kyu Lee, Gyunggi-do (KR); Chan Gwang An, Gyunggi-do (KR); Jae Suk Sung, Gyunggi-do (KR); Ki Won Chang, Gyunggi-do (KR); Chang Mok Han, Chungcheongnam-do (KR); Hyun Do Park, Gyunggi-do (KR)

(73) Assignee: Samsung Electro-Mechanics Co., Ltd., Suwon, Gyunggi-Do (KR)

(*) Notice: Subject to any disclaimer, the term of this patent is extended or adjusted under 35 U.S.C. 154(b) by 711 days.

(21) Appl. No.: 13/032,365

(22) Filed: Feb. 22, 2011

(65) Prior Publication Data

US 2011/0260932 A1  Oct. 27, 2011

(30) Foreign Application Priority Data

Apr. 22, 2010  (KR) .......... 10-2010-0037351

(51) Int. Cl.
*H01Q 1/24* (2006.01)
*B29C 45/14* (2006.01)
(Continued)

(52) U.S. Cl.
CPC .......... *H01Q 1/243* (2013.01); *B29C 45/14065* (2013.01); *B29C 45/14639* (2013.01); *H01Q 1/40* (2013.01); *B29L 2031/3431* (2013.01); *B29L 2031/3456* (2013.01)
USPC .................................... 343/702; 343/700 MS

(58) Field of Classification Search
CPC ........ H01Q 1/243; H01Q 1/38; H01Q 9/0421
USPC .......................................... 343/702, 700 MS
See application file for complete search history.

(56) References Cited

U.S. PATENT DOCUMENTS

| 6,396,444 | B1 | 5/2002 | Goward et al. |
| 2003/0045324 | A1 | 3/2003 | Nagumo et al. |
| 2003/0058174 | A1* | 3/2003 | Sung ............................. 343/702 |

(Continued)

FOREIGN PATENT DOCUMENTS

| JP | 2003036431 A | 2/2003 |
| JP | 2003-078333 A | 3/2003 |

(Continued)

OTHER PUBLICATIONS

Korean Office Action dated 10-2010-0037351 issued Aug. 19, 2011.

(Continued)

*Primary Examiner* — Dameon E Levi
*Assistant Examiner* — Collin Dawkins
(74) *Attorney, Agent, or Firm* — McDermott Will & Emery LLP

(57) ABSTRACT

There is provided an antenna pattern frame according to an exemplary embodiment of the present invention, including: a film radiator that includes a protective film supporting one surface or both surfaces of a radiator provided with an antenna pattern part; and a radiator frame that is an injection molded part to which the film radiator is fixed and embeds the antenna pattern part in the electronic device case.

17 Claims, 10 Drawing Sheets

(51) Int. Cl.
*H01Q 1/40* (2006.01)
*B29L 31/34* (2006.01)

(56) References Cited

U.S. PATENT DOCUMENTS

| | | | |
|---|---|---|---|
| 2007/0109201 A1* | 5/2007 | Licul et al. | 343/702 |
| 2008/0158093 A1 | 7/2008 | Hong | |
| 2008/0278401 A1* | 11/2008 | Yu | 343/878 |
| 2009/0015490 A1 | 1/2009 | Honda et al. | |
| 2009/0015507 A1 | 1/2009 | Hong et al. | |
| 2009/0051616 A1 | 2/2009 | Hong et al. | |
| 2009/0053439 A1* | 2/2009 | Sung et al. | 428/35.7 |
| 2009/0058733 A1 | 3/2009 | Kurashima et al. | |
| 2009/0237309 A1 | 9/2009 | Ohba et al. | |
| 2009/0284436 A1* | 11/2009 | McCarthy et al. | 343/872 |
| 2009/0322624 A1* | 12/2009 | Hong et al. | 343/702 |
| 2010/0220028 A1 | 9/2010 | Cho et al. | |
| 2010/0234082 A1 | 9/2010 | Hong et al. | |
| 2010/0271270 A1* | 10/2010 | Sung et al. | 343/702 |
| 2010/0271283 A1 | 10/2010 | Sung et al. | |

FOREIGN PATENT DOCUMENTS

| | | | | |
|---|---|---|---|---|
| JP | 2003078323 | A | 3/2003 | |
| JP | 2003158415 | A | 5/2003 | |
| JP | 2003-234668 | A | 8/2003 | |
| JP | 2003258530 | A | 9/2003 | |
| JP | 2006270850 | A | 10/2006 | |
| JP | 2008072559 | A | 3/2008 | |
| JP | 2008167390 | A | 7/2008 | |
| JP | 2009-022001 | A | 1/2009 | |
| JP | 2009021932 | A | 1/2009 | |
| JP | 2009-060268 | A | 3/2009 | |
| JP | 20091049992 | A | 3/2009 | |
| JP | 2009-232165 | A | 10/2009 | |
| KR | 20060088073 | A | 8/2006 | |
| KR | 100910161 | B1 | 7/2009 | |
| KR | 10-0930207 | B1 | 12/2009 | |
| KR | 100935954 | B1 * | 1/2010 | H04B 1/38 |
| KR | 10-0944932 | B1 | 3/2010 | |
| KR | 100945117 | B1 | 3/2010 | |

OTHER PUBLICATIONS

Office Action corresponding to CN 201110098299.5, dated Apr. 28, 2013.
Office Action corresponding to JP 2011-049038, dated Sep. 4, 2012.
Chinese Office Action with English translation issued in Chinese Application No. 201110098299.5 issued on Dec. 10, 2013.
Extended European Search Report issued in European Application No. 11250420.4 issued on Nov. 8, 2013.
Chinese Office Action issued in Chinese Application No. 201110098299.5 dated Jun. 30, 2014, w/English translation.
Japanese Office Action issued in Japanese Application No. 2013-066458 dated Jul. 29, 2014 with English translaiton.

* cited by examiner

ANTENNA PATTERN FRAME, ELECTRONIC DEVICE CASE PROVIDED WITH ANTENNA PATTERN FRAME AND ELECTRONIC DEVICE INCLUDING ELECTRONIC DEVICE CASE

CROSS-REFERENCE TO RELATED APPLICATIONS

This application claims the priority of Korean Patent Application No. 10-2010-0037351 filed on Apr. 22, 2010, in the Korean Intellectual Property Office, the disclosure of which is incorporated herein by reference.

BACKGROUND OF THE INVENTION

1. Field of the Invention

The present invention relates to an antenna pattern frame, an electronic device case provided with the antenna pattern frame, and an electronic device including the electronic device case.

2. Description of the Related Art

An Electronic device such as a mobile communication terminal, for example, a cellular phone, a PDA, a navigation device, a notebook computer, or the like, that support wireless communication, are necessities in modern society. The mobile communication terminals have been developed to have functions, such as CDMA, wireless LAN, GSM, DMB, and the like. One of the most important components that enable these functions is an antenna.

The antenna used in the mobile communication terminal has evolved from an exterior type antenna such as a rod antenna or a helical antenna to an interior type antenna mounted in the terminal.

There have been problems in that the exterior type antenna is vulnerable to external impact and the interior type antenna increases the volume of the terminal.

In order to solve these problems, a research to integrate the electronic device, i.e., the mobile communication terminal and the antenna has been actively conducted.

SUMMARY OF THE INVENTION

An aspect of the present invention provides an antenna pattern frame formed by fixing a radiator provided with an antenna pattern to a protective film to form a film radiator and fixing the film radiator to an injection molded part, i.e., a radiator frame.

An aspect of the present invention also provides an electronic device case in which antenna pattern is embedded by using an antenna pattern frame to which a film radiator is fixed.

An aspect of the present invention also provides an electronic device manufactured by using an antenna pattern frame to which a film radiator is fixed.

According to an aspect of the present invention, there is provided an antenna pattern frame, including: a film radiator that includes a protective film supporting one surface or both surfaces of a radiator provided with an antenna pattern part; and a radiator frame that is an injection molded part to which the film radiator is fixed and embeds the antenna pattern part in the electronic device case.

The radiator further includes a connection terminal part that transmits and receives signals from the antenna pattern part to and from a circuit substrate of the electronic device and a connection part that forms the antenna pattern part and the connection terminal part on different plane, wherein the antenna pattern part may be formed on one surface of the radiator frame and the connection terminal part may be formed on an opposite surface of the radiator frame.

The connection part may be fixed along the outer surface of the radiator frame.

The connection part may be fixed along a through hole formed in the radiator frame.

The radiator may be provided in plural and may be fixed to the protective film.

Each of the plurality of radiators further includes the connection terminal part that transmits and receives the signals from the antenna pattern part to the circuit substrate of the electronic device, wherein the antenna pattern part may be formed on one surface of the radiator frame and the connection terminal part may be formed on an opposite surface of the radiator frame.

The radiator frame may include a receiving groove in which the film radiator is received.

The thickness of the film radiator may be the same as the depth of the receiving groove.

The film radiator may include a guide pin hole in which a guide pin of a mold for manufacturing the electronic device is disposed in order to prevent the radiator frame from moving in the mold for manufacturing the electronic device.

The film radiator may be disposed on a cover part of the radiator frame.

According to another aspect of the present invention, there is provided an electronic device case, including: an antenna pattern frame that includes an injection molded part, a radiator frame to which a film radiator including a protective film supporting one surface or both surfaces of a radiator provided with an antenna pattern part is fixed; and a case frame that covers one surface of the radiator frame provided with the antenna pattern part so that the antenna pattern part is embedded in the radiator frame.

The case frame may be an injection molded part and may be provided with a receiving groove corresponding to one surface of the radiator frame.

The case frame may be manufactured by an injection molding in the radiator frame.

The radiator further includes a connection terminal part that transmits and receives signals from the antenna pattern part to and from a circuit substrate of the electronic device and a connection part that forms the antenna pattern part and the connection terminal part on different plane, wherein the antenna pattern part may be formed on one surface of the radiator frame and the connection terminal part may be formed on an opposite surface of the radiator frame.

The connection part may be fixed along the outer surface of the radiator frame.

The connection part may be fixed along a through hole formed in the radiator frame.

The radiator may be provided in plural and may be fixed to the protective film.

Each of the plurality of radiators further includes the connection terminal part that transmits and receives the signals from the antenna pattern part to the circuit substrate of the electronic device, wherein the antenna pattern part may be formed on one surface of the radiator frame and the connection terminal part may be formed on an opposite surface of the radiator frame.

The radiator frame may include a receiving groove in which the film radiator is received.

The thickness of the film radiator may be the same as the depth of the receiving groove.

The film radiator may include a guide pin hole in which a guide pin of a mold for manufacturing the electronic device is disposed in order to prevent the radiator frame from moving in the mold for manufacturing the electronic device.

The film radiator may be disposed on a cover part of the radiator frame.

According to another aspect of the present invention, there is provided an electronic device, including: an electronic device case; and a circuit substrate that transmits or receives signals from the film radiator.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
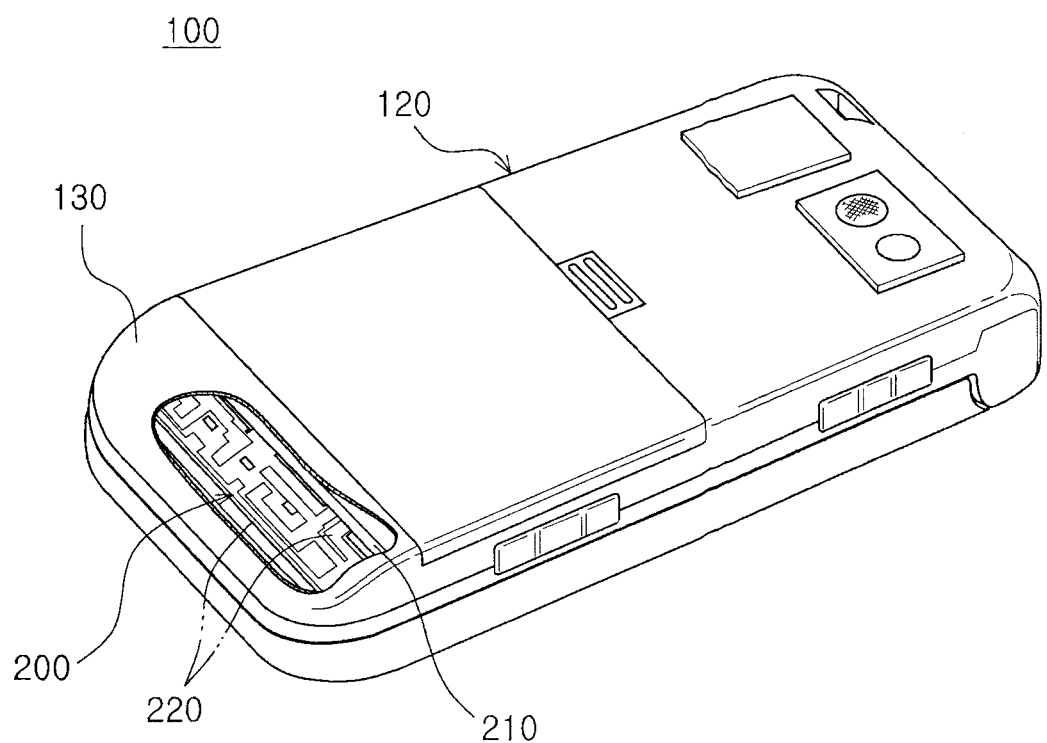
FIG. 1 is a perspective view schematically showing a partially cutaway case of an electronic device, a mobile communication terminal according to an exemplary embodiment of the present invention.

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit but those are construed as being included in the spirit of the present invention.

Further, throughout the drawings, the same or similar reference numerals will be used to designate the same components or like components having the same functions in the scope of the similar idea.

Figure 2:
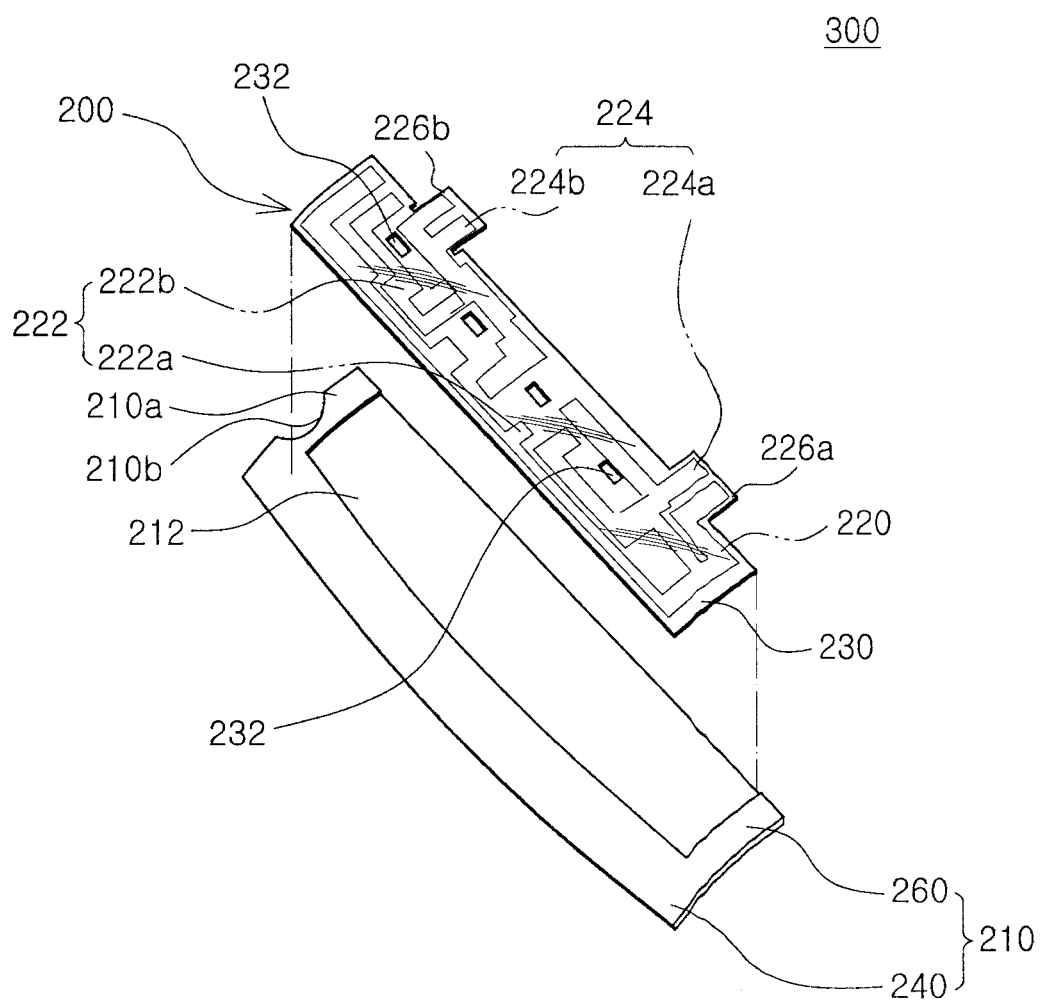
FIG. 2 is a schematic exploded perspective view of an antenna pattern frame according to a first exemplary embodiment of the present invention.
Figure 3:
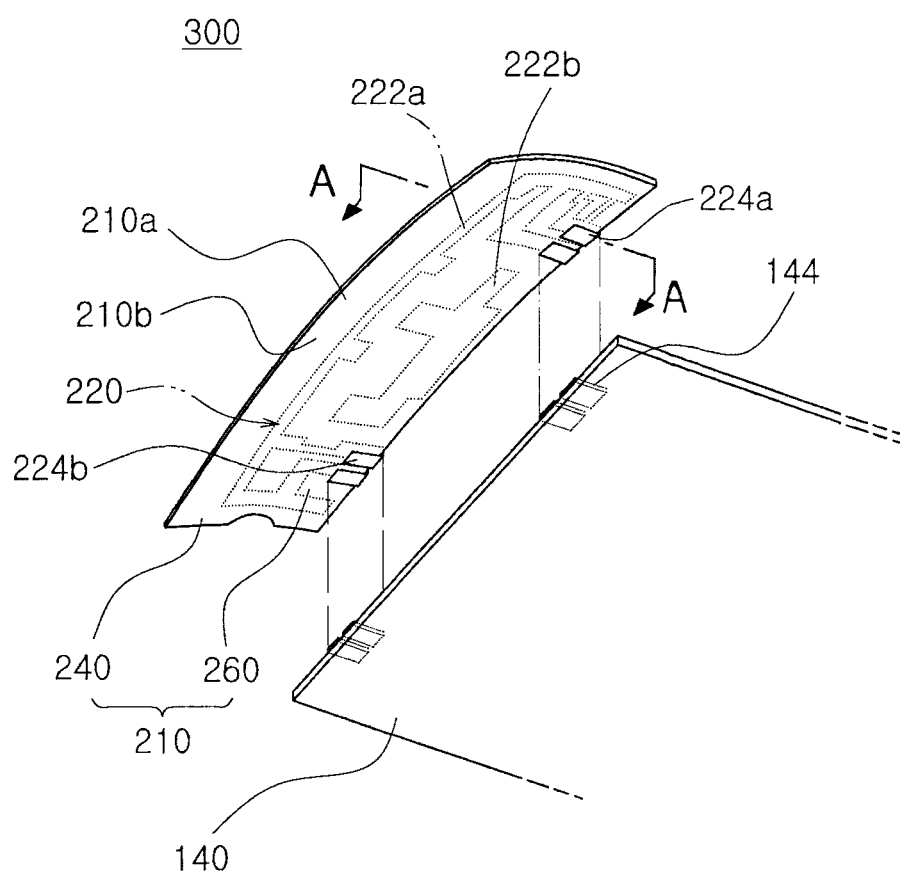
FIG. 3 is a rear perspective view of the antenna pattern frame of FIG. 2.
Figure 4A:
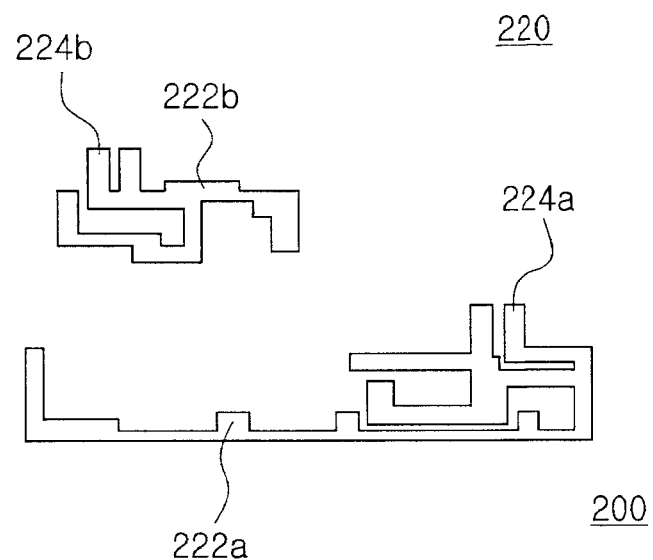
FIGS. 4A and 4B are a schematic plan view of a radiator according to the present invention and a film radiator formed by fixing the radiator to a protective film.
Figure 4B:
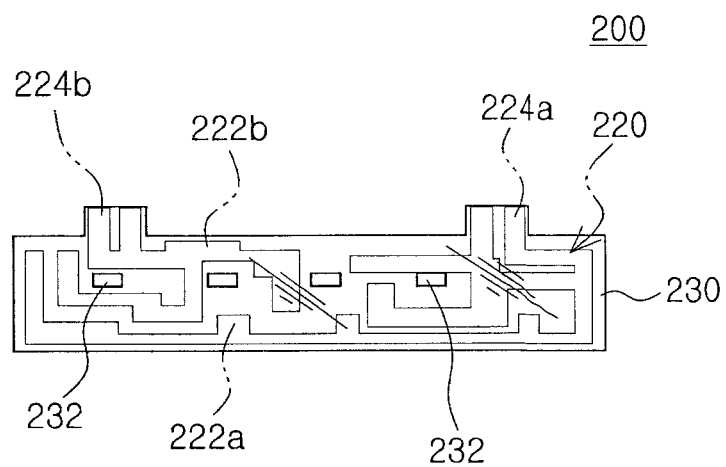
Figure 5:
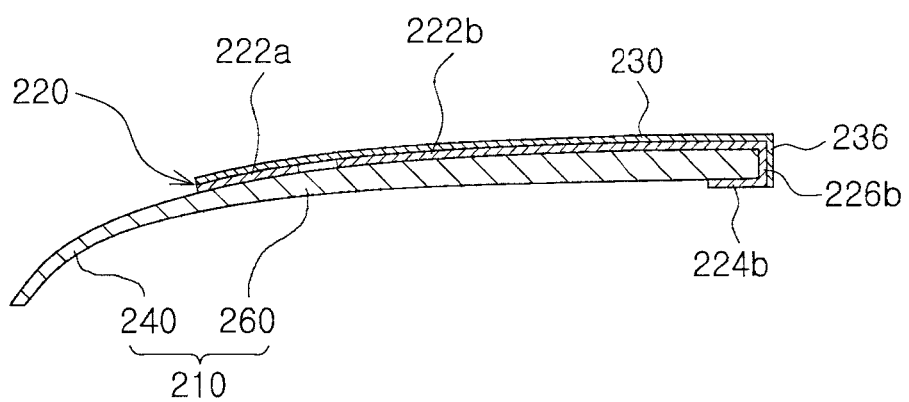
FIG. 5 is a cross-sectional view taken along line A-A of FIGS. 2 and 3.

FIG. 1 is a perspective view schematically showing a partially cutaway case of an electronic device, a mobile communication terminal according to an exemplary embodiment of the present invention, FIG. 2 is a schematic exploded perspective view of an antenna pattern frame according to a first exemplary embodiment of the present invention, FIG. 3 is a rear perspective view of the antenna pattern frame of FIG. 2, FIGS. 4A and 4B are a schematic plan view of a radiator according to the present invention and a film radiator formed by fixing the radiator to a protective film, and FIG. 5 is a cross-sectional view taken along line A-A of FIGS. 2 and 3.

It can be appreciated, from FIG. 1 to 5, that a film radiator 200 including an antenna pattern part 222 is embedded in a case 120 of an electronic device, a mobile communication terminal 100 according to an exemplary embodiment of the present invention. An antenna pattern frame 300 forming the film radiator 200 on the radiator frame 210 so that the antenna pattern part 222 is embedded in the case 120 is needed, wherein the film radiator 200 includes a protective film 230 supporting one surface or both surfaces of the radiator 220 provided with the antenna pattern part 222.

Electronic Device

The mobile communication terminal 100 that is one example of the electronic device may include the antenna pattern frame 300, a case frame 130, and a circuit substrate 140.

As shown in FIG. 1, the antenna pattern frame 300 may be fixed into the case frame 130 of the mobile communication terminal 100. Further, as will be described in detail below, the antenna pattern frame 30C is injection-molded by a mold 50 for manufacturing the electronic device case 120, such that it may be integrated with the case frame 130.

The circuit substrate 140 is mounted with circuit devices that transmits and receives signals to and from the antenna pattern part 222 of the film radiator 200 and may be formed with a connection line 144 that is connected to a connection terminal part 224 of the antenna pattern frame 300.

Antenna Pattern Frame

The radiator 220 is made of a conductive material such as aluminum, copper, or the like, to receive external signals and to transmit them to a signal processing unit in the electronic device such as the mobile communication terminal 100. Further, the radiator 220 may include the antenna pattern part 222 forming a meander line in order to receive the external signals of various bands.

The film radiator 200 may include the protective film 230 supporting one surface or both surfaces of the radiator 220 provided with the antenna pattern part 222.

The protective film 230 is made of high molecular weight plastic and may be a film made of a flexible print circuit board (FPCB) material. The protective film 230 is bonded to one surface or both surfaces of the radiator 220 to fix the radiator 220.

In this case, the plurality of radiators 220 may be fixedly bonded to the protective film 230. The exemplary embodiment where the radiator 220 is formed in two will be described in detail.

The two radiators 220 may include a first connection terminal part 224a and a second connection terminal part 224b that transmit and receive signals from a first antenna pattern part 222a and a second antenna pattern part 222b to and from the circuit substrate 140 of the electronic device 100.

One surface or both surfaces of the two radiators 220 may be supported by the protective film 230. The first and second antenna pattern part 222a and 222b may be formed on one surface 210a of the radiator frame 210, and the first and second connection terminal parts 224a and 224b may be formed on the opposite surface 210b of the radiator frame 210. In other words, the first and second antenna pattern parts 222a and 222b and the first and second connection terminal parts 224a and 224b may be formed on a plane different from one surface 210a and the opposite surface 210b of the radiator frame 210. Each radiator 220 may include a first connection part 226a and a second connection part 226b that connect the first and second antenna pattern parts 222a and 222b to the first and second connection terminal parts 224a and 224b.

The radiator frame 210 may include a flat part 260 whose upper surface is flat and a curved part 240 whose upper surface is curved, based on the shape of the upper surface and may be fixed to the curved part 240 by the elasticity of the film radiator 200.

The antenna pattern frame 309 according to the first exemplary embodiment will be described with reference to FIGS. 2 and 5. The radiator frame 210 according to the first exemplary embodiment of the antenna pattern frame 300 may include a receiving groove 212 that receives the film radiator 200.

Figure 10:
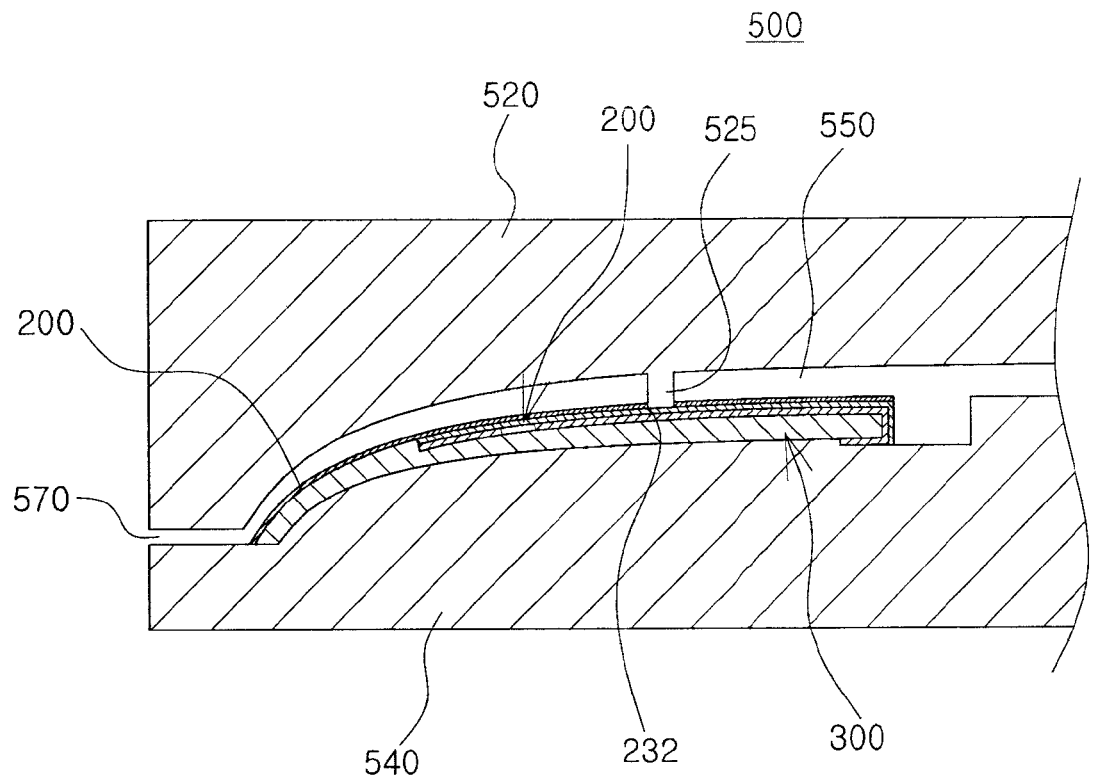
FIG. 10 is a schematic diagram showing a mold for manufacturing an electronic device case used in a method for manufacturing an electronic device case according to a second exemplary embodiment of the present invention in which the antenna pattern part is embedded.
Figure 11:
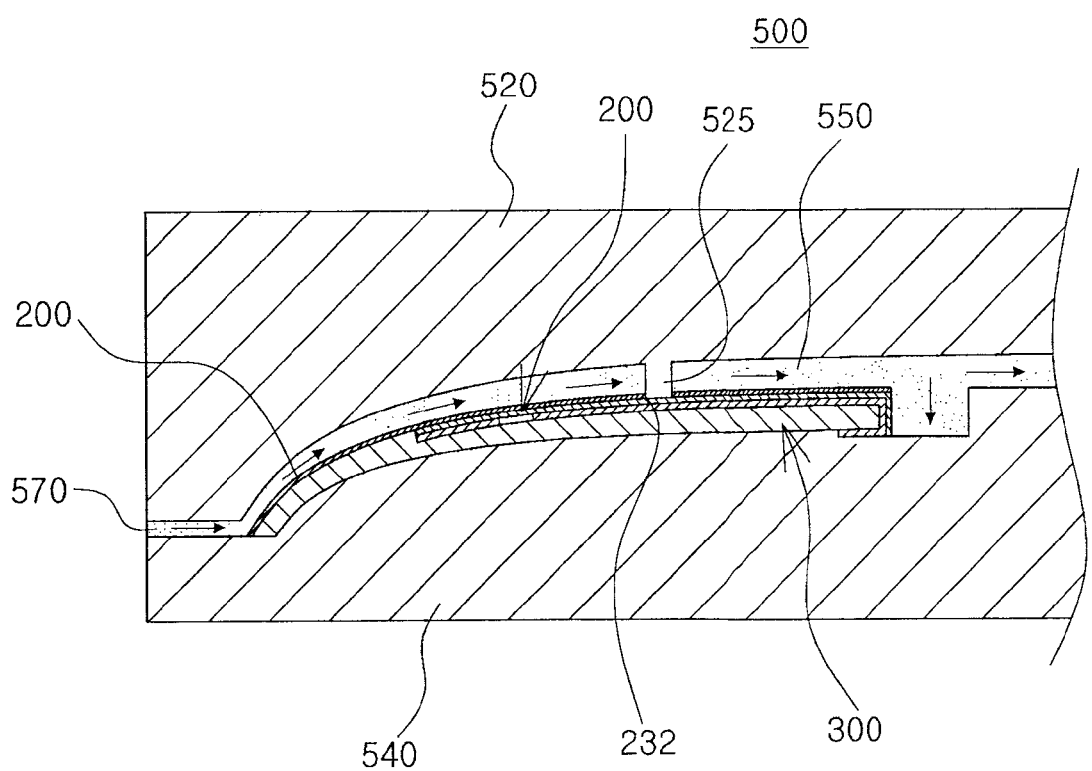
FIG. 11 is a schematic diagram showing a shape where a resin material is filled in the manufacturing mold of FIG. 10.

In this configuration, the thickness of the film radiator 200 may be the same as the depth of the receiving groove 212. If the thickness of the film radiator 200 is the same as the depth of the receiving groove 212, it is possible to improve the flowability of an injection liquid, a resin, when performing the injection molding to manufacture the electronic device case 120 (FIGS. 10 and 11).

Meanwhile, referring to FIG. 4B, the film radiator 200 may include a guide pin hole 232 in which a guide pin 525 of a mold 500 for manufacturing the electronic device case (FIGS. 10 and 11) is disposed in order to prevent the radiator frame 210 from moving in the mold 500 for manufacturing the electronic device case.

Figure 6:
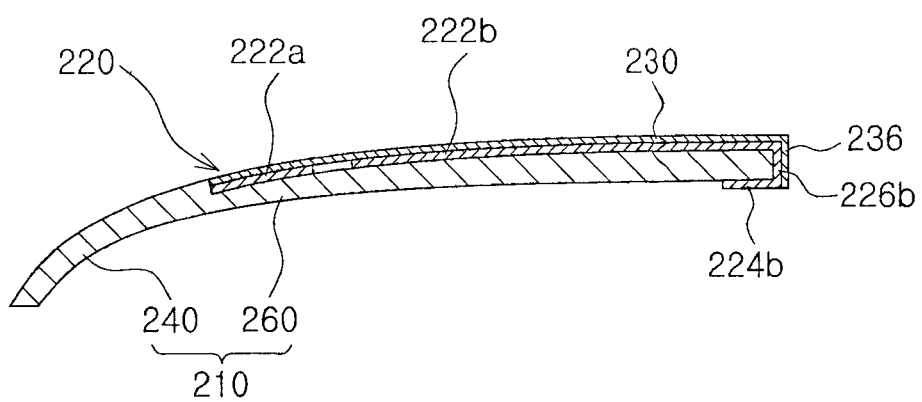
FIG. 6 is a schematic cross-sectional view of an antenna pattern frame according to a second exemplary embodiment of the present invention.
Figure 7:
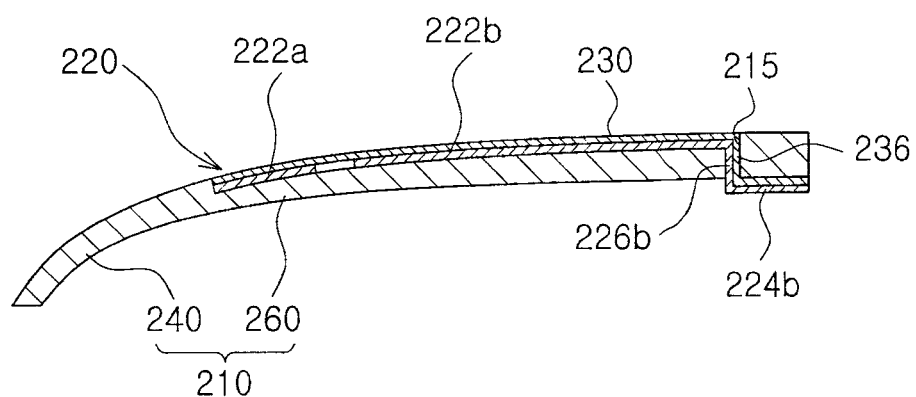
FIG. 7 is a schematic cross-sectional view of an antenna pattern frame according to a third exemplary embodiment of the present invention.

FIG. 6 is a schematic cross-sectional view of an antenna pattern frame according to a second exemplary embodiment of the present invention and FIG. 7 is a schematic cross-sectional view of an antenna pattern frame according to a third exemplary embodiment of the present invention.

Unlike the first exemplary embodiment, the antenna pattern frame 300 according to a second embodiment shown in FIG. 6 does not have the receiving groove 212 that receives the film radiator 200 on the radiator frame 210 and is fixed to contact the film radiator 200 to the outer surface of the radiator frame 210.

The second connection part 226b of the radiator 220 may be fixed along the outer surface of the radiator frame 210. In FIG. 6, the second connection part 226b may be fixed to contact the side of the radiator frame 210. In this case, the protective film 230 may also include a connection part 236 covering the second connection part 226b.

The connection terminal part 224b may be exposed to the outside of the protective film 230 in order to connect to a connection pad 144 of the circuit substrate 140.

Unlike the first and second exemplary embodiments, the antenna pattern frame 300 according to a third exemplary embodiment shown in FIG. 7 may be fixed along a through hole 215 through which the second connection part 226b of the radiator 220 is formed in the radiator frame 210.

As described above, the film radiator 200 may be fixed on the radiator frame 210 by the elasticity of the protective film 230.

Electronic Device Case and Method for Manufacturing Electronic Device Case

Figure 8:
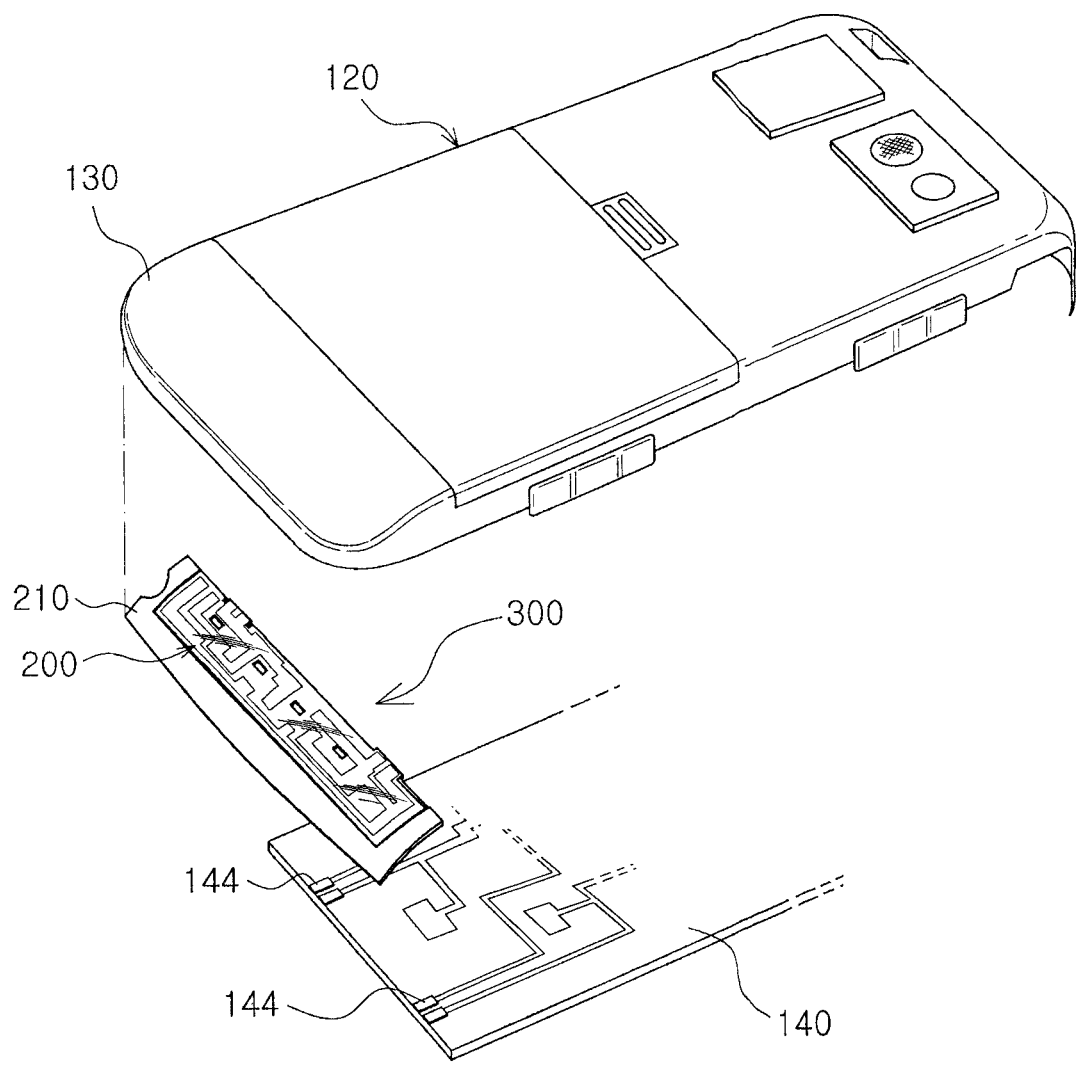
FIG. 8 is an exploded perspective view of a case of an electronic device, a mobile communication terminal according to an exemplary embodiment of the present invention in which the antenna pattern part is embedded.

FIG. 8 is an exploded perspective view of the case of the electronic device, the mobile communication terminal according to an exemplary embodiment of the present invention in which the antenna pattern radiator is embedded.

Figure 9:
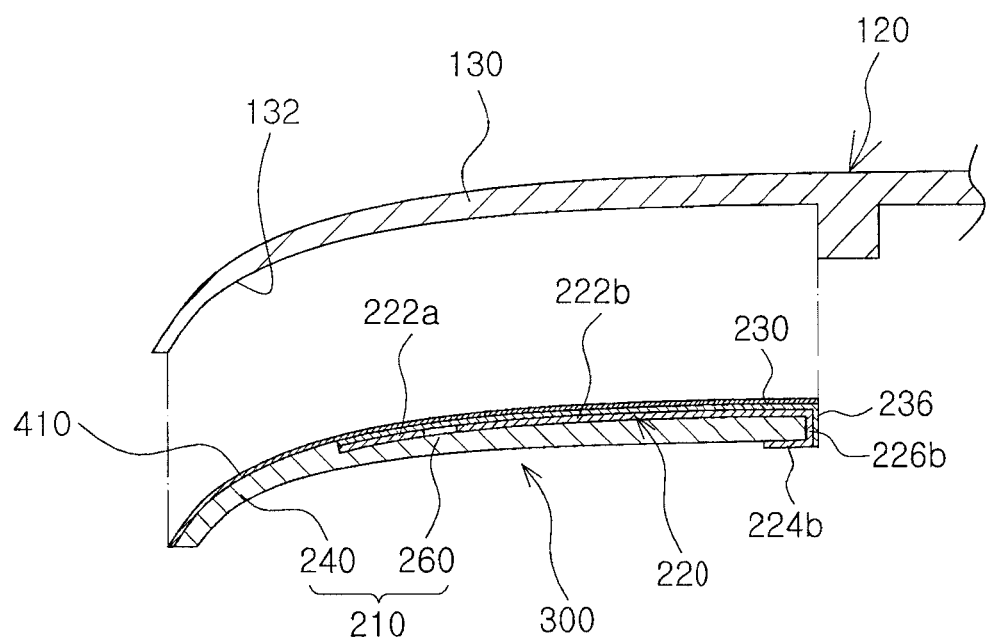
FIG. 9 is a schematic diagram showing a method for manufacturing an electronic device case according to a first exemplary embodiment of the present invention in which the antenna pattern part is embedded.

FIG. 9 is a schematic diagram showing a method for manufacturing an electronic device case according to a first exemplary embodiment of the present invention in which the antenna pattern part is embedded, FIG. 10 is a schematic diagram showing a mold for manufacturing an electronic device case used in a method for manufacturing an electronic device case according to a second exemplary embodiment of the present invention in which the antenna pattern part is embedded, and FIG. 11 is a schematic diagram showing a shape where a resin material is filled in the manufacturing mold of FIG. 10.

Referring to FIG. 8, the electronic device case 120 has a shape when the antenna pattern frame 380 including the film radiator 200 is integrated with the case frame 130.

In other words, the electronic, device case 120 may include the antenna pattern frame 300 and the case frame 130.

The antenna pattern frame 300 may include all the technical features described above and may be implemented in various exemplary embodiments.

The case frame 130 may be a previously manufactured injection molded part as shown in FIG. 9. In this case, the case frame 130 may be provided with the receiving part 132 that can receive the antenna pattern frame 300.

In this case, an adhesive 410 is applied to the upper surface of the antenna pattern frame 300 or in the receiving part 132, such that the antenna pattern frame 300 can be manufactured to be bonded to the receiving part 132.

Meanwhile, as shown in FIGS. 10 and 11, the case frame 130 may be injection-molded in the radiator frame 210.

In other words, the antenna pattern frame 300 may be integrated with the case frame 130 by putting the antenna pattern frame 300 in the mold 500 for manufacturing the electronic device case 120 and performing the insert injection thereon.

The mold 500 for manufacturing the electronic device case may include an upper mold 520, a lower mold 540, and an injection liquid inlet 570. When the upper mold 520 is combined with the lower mold 540, an inner space 550 is formed in the shape of the case frame 130.

A guide pin 525 formed in the upper mold 520 is inserted into the guide pin hole 232 formed in the film radiator 200 of the antenna pattern frame 300 to prevent the injection liquid from moving in the inner space 550 of the antenna pattern frame 300 when the injection liquid is introduced.

The radiator 220 cannot be directly provided with holes due to the formation of the guide pin hole 232, thereby making it possible to improve the antenna performance.

The guide pin 525 may be formed in the lower mold 540 or the upper and lower molds 520 and 540.

Application Example of Electronic Device

Figure 12:
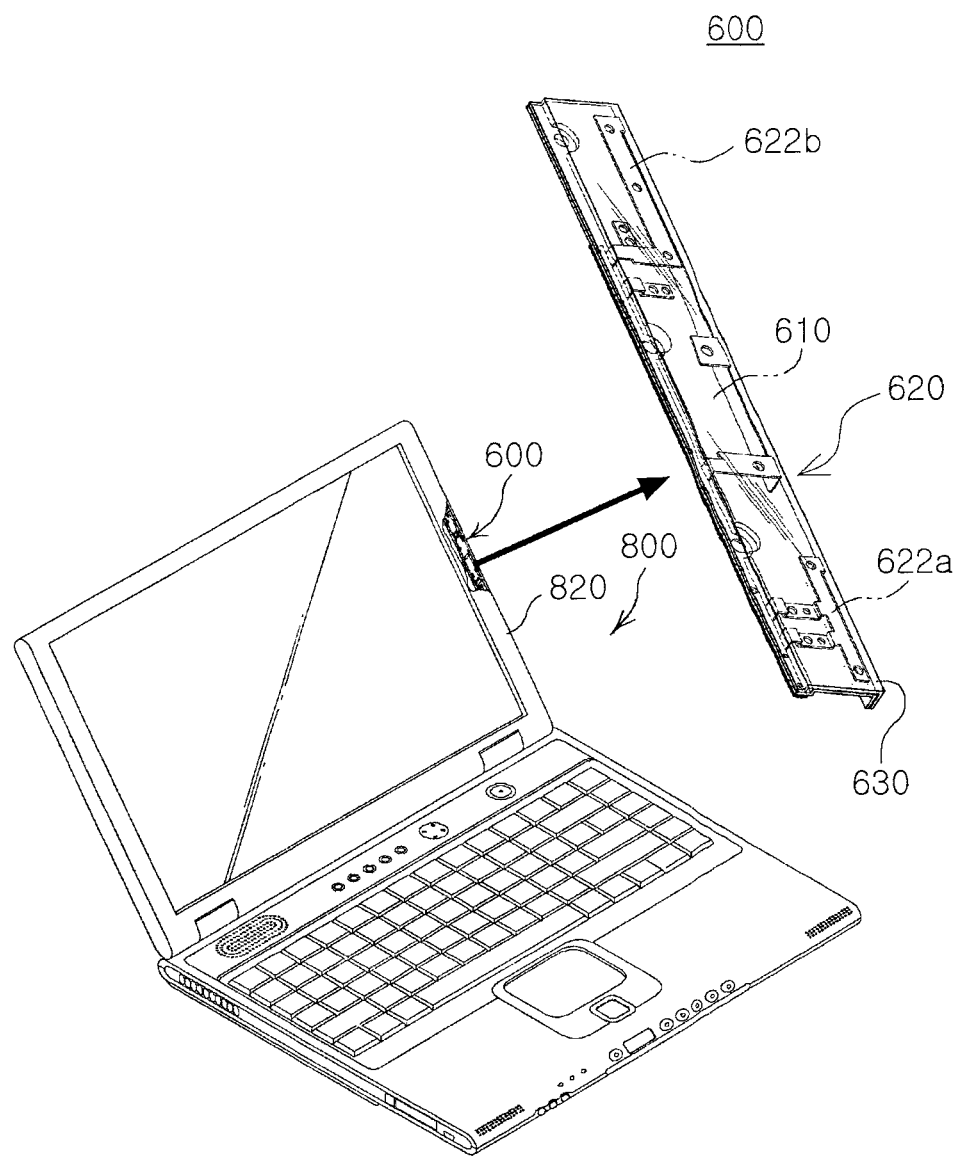
FIG. 12 is a schematic partial cutaway perspective view of an electronic device, a notebook according to another exemplary embodiment of the present invention.

FIG. 12 is a schematic partial cutaway perspective view of an electronic device, a notebook according to another exemplary embodiment of the present invention.

FIG. 12 shows an electronic device, a notebook 800 according to another exemplary embodiment of the present invention.

Recently, the notebook 800 is mounted with a function of receiving an image signal of a low frequency band such as DMB. The antenna pattern frame 600 is applied to the above-mentioned notebook 800, thereby making it possible to manufacture a case 820 of the notebook 800 in which the radiator 620 is embedded.

The radiator 620 may include each of the antenna pattern parts 622a and 622b having different lengths, and the antenna pattern parts 622a and 622b may be fixed by the protective film 630 and then, be formed on the radiator frame 610.

As set forth above, the antenna pattern frame, the electronic device case, and the electronic device can remove the high-temperature and high-pressure injection molding process by disposing only the metal plate, the radiator, in the mold for manufacturing the antenna pattern frame.

Further, the present invention can fix the plurality of antenna pattern parts by one film radiator to simplify the structure of the mold for manufacturing the antenna pattern frame and implement various antenna patterns in one antenna pattern frame.

In addition, the present invention can remove the manufacturing mold required to perform the injection molding when manufacturing the antenna pattern frame so that the radiator does not have to form the pin hole for fixing the radiator to the manufacturing mold, thereby making it possible to improve the antenna performance.

Moreover, the present invention can simply manufacture the antenna pattern frame and the electronic device case and reduce the manufacturing cost thereof, as compared with the double injection molding process.

While the present invention has been shown and described in connection with the exemplary embodiments, it will be apparent to those skilled in the art that modifications and variations can be made without departing from the spirit and scope of the invention as defined by the appended claims.

What is claimed is:

1. An antenna pattern frame, comprising:
   a film radiator that includes a protective film to which a plurality of radiators are fixed, each radiator having an antenna pattern part; and
   a radiator frame having a receiving groove, in which the film radiator is fixed
   wherein each of the plurality of radiators further includes a connection terminal part that transmits and receives the signals from the antenna pattern part to a circuit substrate of the electronic device.

2. The antenna pattern frame of claim 1, wherein the radiator further includes a connection part that forms the antenna pattern part and the connection terminal part on different plane.

3. The antenna pattern frame of claim 2, wherein the connection part is fixed along the outer surface of the radiator frame.

4. The antenna pattern frame of claim 2, wherein the connection part is fixed along a through hole formed in the radiator frame.

5. The antenna pattern frame of claim 1, wherein the thickness of the film radiator is the same as the depth of the receiving groove.

6. The antenna pattern frame of claim 1, wherein the film radiator includes a guide pin hole in which a guide pin of a mold for manufacturing the electronic device is disposed in order to prevent the radiator frame from moving in the mold for manufacturing the electronic device.

7. The antenna pattern frame of claim 1, wherein the film radiator is disposed on a cover part of the radiator frame.

8. The antenna pattern frame of claim 1, wherein the antenna pattern part is formed on one surface of the radiator frame and the connection terminal part is formed on an opposite surface of the radiator frame.

9. An electronic device case, comprising:
   an antenna pattern frame including a radiator frame that is an injection molded part to which a film radiator is fixed, the film radiator including a protective film to which a plurality of radiators are fixed, each radiator having an antenna pattern part, wherein the radiator frame has a receiving groove in which the film radiator is fixed; and
   a case frame that covers one surface of the radiator frame wherein the case frame is integrated with the radiator frame with a mold,
   wherein each of the plurality of radiators further includes a connection terminal part that transmits and receives the signals from the antenna pattern part to a circuit substrate of the electronic device.

10. The electronic device case of claim 9, wherein the radiator further includes a connection part that forms the antenna pattern part and the connection terminal part on different plane.

11. The electronic device case of claim 10, wherein the connection part is fixed along the outer surface of the radiator frame.

12. The electronic device case of claim 10, wherein the connection part is fixed along a through hole formed in the radiator frame.

13. The electronic device case of claim 9, wherein the thickness of the film radiator is the same as the depth of the receiving groove.

14. The electronic device case of claim 9, wherein the film radiator includes a guide pin hole in which a guide pin of a mold for manufacturing the electronic device is disposed in order to prevent the radiator frame from moving in the mold for manufacturing the electronic device.

15. The electronic device case of claim 9, wherein the film radiator is disposed on a cover part of the radiator frame.

16. An electronic device comprising:
   an electronic device case of claim 9; and
   a circuit substrate that transmits or receives signals from the film radiator.

17. The electronic device case of claim 9, wherein the antenna pattern part is formed on one surface of the radiator frame and the connection terminal part is formed on an opposite surface of the radiator frame.

* * * * *